United States Patent [19]
Sakakibara et al.

[11] Patent Number: 5,924,450
[45] Date of Patent: Jul. 20, 1999

[54] CONTROL VALVE AND HYDRAULIC CONTROL DEVICE FOR CONTINUOUSLY VARIABLE TRANSMISSION DEVICES

[75] Inventors: Shiro Sakakibara; Norio Imai, both of Anjo, Japan

[73] Assignee: Aisin Aw Co., Ltd, Anjo, Japan

[21] Appl. No.: 08/943,202

[22] Filed: Oct. 3, 1997

[30] Foreign Application Priority Data

Oct. 3, 1996 [JP] Japan .................................. 8-263343

[51] Int. Cl.$^6$ .................................................. F15B 13/042
[52] U.S. Cl. ...................................................... 137/625.66
[58] Field of Search .......................................... 137/625.66

[56] References Cited

FOREIGN PATENT DOCUMENTS 8-178049  7/1996  Japan .

*Primary Examiner*—Gerald A. Michalsky
*Attorney, Agent, or Firm*—Oliff & Berridge, PLC

[57] ABSTRACT

A control valve is shown for a continuously variable transmission, with a spool of the control valve being maintained at a fixed transmission ratio position between an up-shift position and a downshift position when a signal pressure supplied to the control valve falls within a certain range. The signal pressure is provided to the control valve through a pressure line that is divided, with one branch of the signal pressure line being connected to a first input port of the control valve and the other branch being connected to a second input port through an orifice. Application of a signal pressure within a certain range results in the drain port being selectively connected with the second input port.

7 Claims, 7 Drawing Sheets

CONTROL VALVE AND HYDRAULIC CONTROL DEVICE FOR CONTINUOUSLY VARIABLE TRANSMISSION DEVICES

BACKGROUND OF THE INVENTION

1. Field of Invention

The invention relates to a control valve that selects an oil path using a spool that moves according to a signal pressure. The invention also relates to a hydraulic control device for continuously variable transmission devices wherein up-shift, fixed transmission ratio, and down-shift positions are selected based on displacement of the spool of the control valve.

2. Description of Related Art

In V-belt continuously variable transmission devices, a belt is generally disposed between two sets of pulleys having a fixed sheave and a movable sheave. The tension on the belt is changed by moving the movable sheave, thus changing the pulley ratio.

In this type of automatic transmission, the use of a signal pressure from a solenoid valve to select between up-shift, fixed transmission ratio, and down-shift positions, is known (e.g., Japanese laid-open publication number 8-178049). In this technology, the signal pressure from the solenoid valve is varied continuously to move the spool of the transmission control valve. The oil path is selected based on the spool position in order to supply, maintain, and drain the hydraulic pressure to the hydraulic actuator of a movable sheave. Providing the up-shift, fixed transmission ratio, and down-shift positions is performed by the supplying, maintaining, and draining of the hydraulic pressure, respectively.

In the continuously variable transmission described above, the spool position corresponding to the fixed transmission ratio is located between the up-shift and down-shift positions. By providing a large land width on the spool, it is possible to prevent hunting from the fixed transmission ratio position to the up-shift or down-shift position even if there is some spool displacement caused by changes in the solenoid valve signal. However, a larger land width on the spool results in a longer transmission control valve.

Also, although the spool position for fixed transmission ratio can be maintained by using a large land width for the spool, but this results in a decrease in the reliability of the control operation since the spool is always being displaced by changes in the signal pressure.

SUMMARY OF THE INVENTION

An object of the present invention is to provide a control valve that is not as long or large as the conventional valve described above, and wherein the spool is kept at a predetermined position when the signal pressure from signal pressure generating means (a solenoid valve in the description above) varies within a certain range.

A further object of the present invention is to provide a transmission control device for continuously variable transmissions wherein a control valve is used as a transmission control valve, and the spool of the control valve is maintained at a fixed transmission ratio position between an up-shift position and a down-shift position when the signal pressure varies within a certain range.

According to an embodiment of the present invention, a spool (S) of a control valve 92 is biased in a first direction by biasing means (k). The spool S moves in a second direction opposite the first direction in response to a signal pressure (P) from a signal pressure generating means (93). Signal pressure (P) is provided to control valve 92 through a pressure line that is divided, with one branch of the signal pressure line being connected to a first input port (a), and the other branch being connected to a second input port (b) through an orifice 99. The pressure provided to input port (a) is $P_1$, and the pressure provided to input port (b) is $P_2$. Application of a signal pressure (P) within a certain range results in a drain port (e) being selectively connected with second input port (b).

According to another embodiment of the invention, the control valve is used as a hydraulic control device for continuously variable transmissions. A spool (S) of the control valve is biased in a first direction by biasing means (k). The spool S moves in a second direction opposite the first direction in response to a signal pressure from a signal pressure generating means (93). In response to continuous displacement of spool (S), oil paths (c, d, f) are selected to provide up-shifting, fixed transmission ratio, and down-shifting. The signal pressure is divided, and one portion of the signal pressure passes through a first branch and is sent to first input port (a). The remaining portion of the signal pressure passes through another branch and is sent to second input port (b) via an orifice (99). When the signal pressure continuously moves spool (S) between the up-shift position, the fixed transmission ratio position, and the down-shift position, drain port (e) of transmission control valve (92) can be made selectively continuous with second input port (b) if a signal pressure (P) is within a range corresponding to the fixed transmission ratio position.

In the present invention according to the above-described first embodiment, when signal pressure (P) from signal pressure generating means (92) is within a predetermined range, a portion of a signal pressure ($P_2$) from second input port (b) is selectively drained from drain port (e). Thus, even if signal pressure (P) varies within the prescribed range, the surplus amount would be drained from drain port (e). The force from biasing means (k) would cancel out signal pressures ($P_1$, $P_2$) from first input port (a) and second input port (b). Thus, the desired position for spool (S) can be maintained.

In the present invention according to the above-described second embodiment, when a signal pressure (P) from signal pressure generating means (92) is within a predetermined range corresponding to a fixed transmission ratio position, a portion of signal pressure ($P_2$) from second input port (b) is selectively drained from drain port (e). Thus, if signal pressure (P) is increased, the surplus amount would be drained from drain port (e). The force from biasing means (k) would cancel out signal pressures ($P_1$, $P_2$) from first input port (a) and second input port (b), and spool (S) would be maintained at the desired position. In other words, when signal pressure (P) is within a predetermined range corresponding to the fixed transmission ratio position, spool (S) can be kept at the desired position even if there is an increase in signal pressure (P). Thus, the land width does not need to be increased unnecessarily in order to prevent hunting between the up-shift position and the down-shift position. This prevents the transmission control valve from becoming too large.

The symbols enclosed with parentheses above are provided solely in reference to the drawings, and do not restrict the present invention in any way.

DETAILED DESCRIPTION OF PREFERRED EMBODIMENTS

Figure 1:
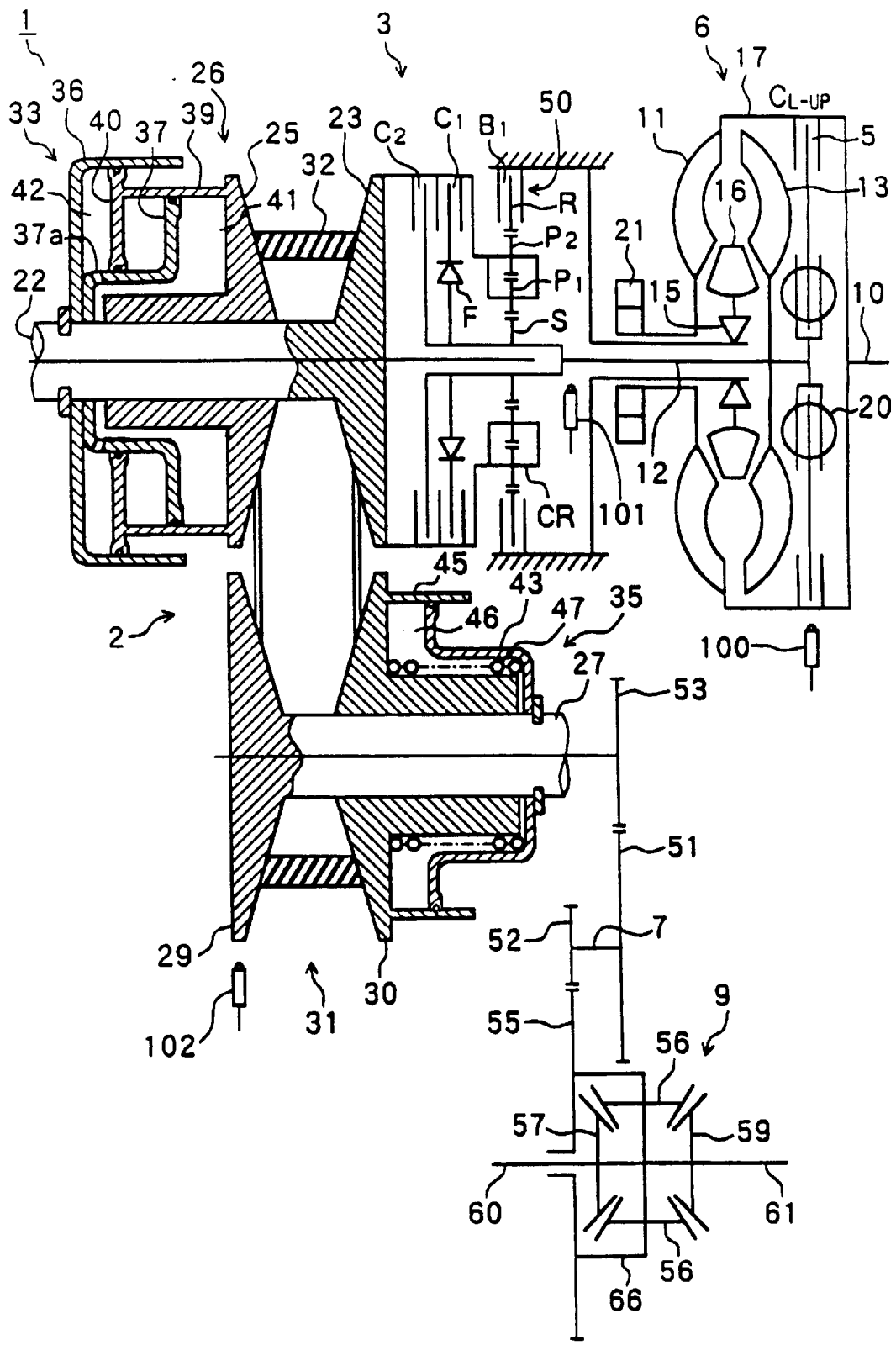
FIG. 1 is schematic drawing of the continuously variable transmission according to an embodiment the present invention.

Referring to the drawings, the following is a description of an embodiment of the present invention.

First, the basic structure will be described for a continuously variable transmission for automobiles that use a hydraulic control device for continuously variable transmissions (hereinafter referred to simply as "hydraulic control device") according to the present invention, as shown in FIG. 1. Then, the basic hydraulic circuit and electronic control section of the continuously variable transmission will be described with reference to FIG. 2 and FIG. 3, respectively. Then, referring to FIG. 1 through FIG. 3, a description of the overall operation of the continuously variable transmission is presented. Finally, the control valve of the present invention is described with reference to FIG. 4 and subsequent figures while also referring to FIG. 1 through FIG. 3.

A continuously variable transmission 1 for vehicles as shown in FIG. 1 comprises: a belt-type continuously variable transmission 2 (hereinafter referred to as "CVT"); a forward/reverse mode selecting device 3; a torque converter 6 equipped with a lock-up clutch 5; a counter shaft 7; and a differential device 9. These devices are covered by a partitioned case.

Torque converter 6 comprises: a pump impeller 11 connected to an engine output shaft 10 via a front cover 17; a turbine runner 13 connected to an input shaft 12; and a stator 16 supported on the transmission case via a one-way clutch 15. A lock-up clutch 5 is interposed between input shaft 12 and front cover 17. A damper spring 20 is interposed between the lock-up clutch plate and input shaft 12. An oil pump 21 is connected to and driven by pump impeller 11.

CVT 2 comprises: a primary pulley 26; a secondary pulley 31; and a metal belt 32 wrapped around pulleys 26, 31. Primary pulley 26 comprises: a fixed sheave 23 fixed to a primary shaft 22; and a movable sheave 25 slidably supported by primary shaft 22. Secondary pulley 31 comprises: a fixed sheave 29 fixed to a secondary shaft 27; and a movable sheave 30 slidably supported by secondary shaft 27.

A hydraulic actuator 33 comprising a double piston is disposed behind movable sheave 25 on the primary side. A hydraulic actuator 35 comprising a single piston is disposed behind movable sheave 30 on the secondary side. Hydraulic actuator 33 on the primary side comprises: a cylinder member 36 and a reaction support member 37 fixed to primary shaft 22; and a piston member 40 and a cylindrical member 39 fixed to a movable sheave 25. A first hydraulic chamber 41 is formed from cylindrical member 39, reaction support member 37, primary shaft 22 and the back surface of movable sheave 25. A second hydraulic chamber 42 is formed from cylinder member 36 and piston member 40. First hydraulic chamber 41 and second hydraulic chamber 42 are made continuous via a continuous hole 37a. As a result of the combination of equal hydraulic pressures in hydraulic chambers 41 and 42, a force in the axial direction is generated that is roughly double that of secondary-side hydraulic actuator 35. Secondary-side hydraulic actuator 35 comprises: a reaction support member 43 fixed to secondary shaft 27; and a cylindrical member 45 fixed to the back surface of movable sheave 30. A single hydraulic chamber 46 is formed by these members and secondary shaft 27. A pre-loading spring 47 is interposed and compressed between movable sheave 30 and reaction support member 43.

Forward/reverse mode switching device 3 comprises: a double-pinion planetary gear 50 for forward/reverse switching; a reverse brake $B_1$; a first clutch $C_1$; a second clutch $C_2$ (for the engine brake); and a one-way clutch F. Second clutch $C_2$, and the combination of first clutch $C_1$ and one-way clutch F are disposed in parallel between input shaft 12 and fixed sheave 23 of primary pulley 26. A sun gear S of planetary gear 50 is connected to input shaft 12. A carrier CR supporting first and second pinions $P_1$, $P_2$ is connected to primary-side fixed sheave 23. A ring gear R is connected to reverse brake $B_1$.

A large gear 51 and a small gear 52 are fixed to a counter shaft 7. Large gear 51 meshes with a gear 53 fixed to secondary shaft 27. Small gear 52 meshes with a gear 55 of a differential device 9.

In differential device 9, the rotation from a differential gear 56 supported by a differential case 66, which contains gear 55, is transferred via left and right side gears 57, 59 to left and right axles 60, 61.

In continuously variable transmission 1 as described above, the control valve according to the invention is used for controlling the oil pressure to hydraulic actuator 33 on the primary pulley side. In other words, the oil pressure to hydraulic actuator 33 is increased or decreased to displace movable sheave 25, and this displacement is used to change or fix the transmission ratio of CVT 2.

Figure 2:
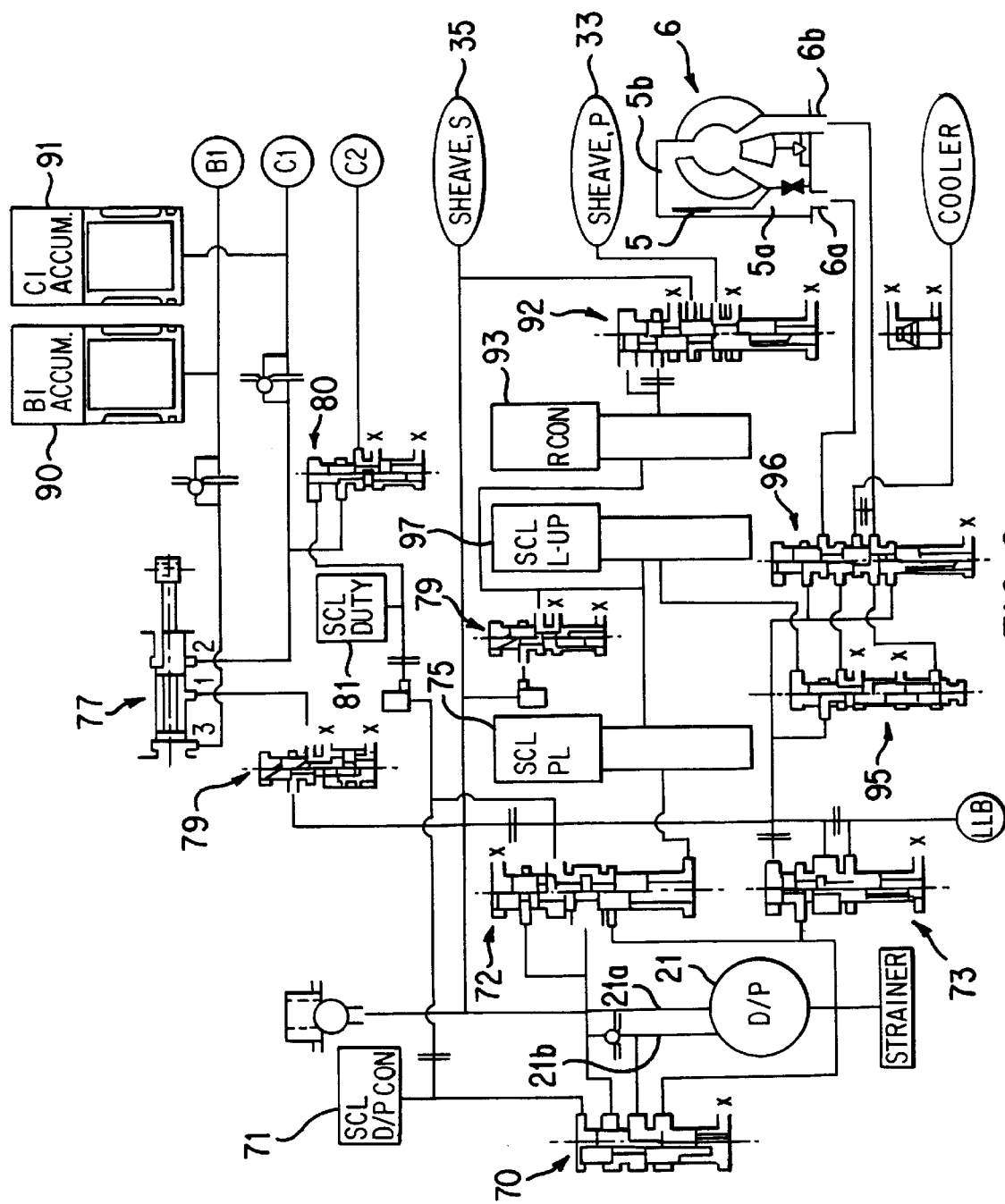
FIG. 2 is a drawing showing the oil-pressure circuit for the present invention.

Referring to FIG. 2, the following is a simple description of the hydraulic circuit of a continuously variable transmission that incorporates the control valve of the invention. In FIG. 2, there is shown oil pump 21, an oil pump control valve 70, and a pump solenoid valve 71 for the oil pump control valve. There is also shown a primary regulator valve 72, a secondary regulator valve 73, a line pressure solenoid valve 75 for controlling line pressure, and a modulator valve 76 for controlling the solenoid valve.

A manual valve 77 is operated manually to switch the oil pressure on port 1 to port 2 or port 3, as shown in the table to the right of and above manual valve 77. In the drawing, there is also shown a modulator valve 79, a C2 control valve 80, a duty control solenoid valve 81, hydraulic servos C1, C2 corresponding to clutches $C_1$, $C_2$, a hydraulic servo B1 corresponding to brake $B_1$, and accumulators 90, 91 for the hydraulic servo B1 and the hydraulic servo C1. The oil pressure at port 2 and port 3 are sent to clutch and brake hydraulic servos C1 and B1 respectively. The oil pressure from port 1 is adjusted to an appropriate oil pressure via a modulator valve 79 to provide modulation pressure for the clutch and the brake. In the drawing, there is also shown a ratio control valve 92, a linear solenoid valve 93 for CVT control (ratio control), and primary and secondary hydraulic actuators 33 and 35.

Referring to FIG. 2, there is shown a lock-up control valve 95, a lock-up relay valve 96, and a lock-up solenoid 97 for lock-up control. A torque converter 6 comprises lock-up clutch 5. An oil path 6a is continuous with a lock-up off oil chamber 5a, and an oil path 6b is continuous with a lock-up on oil chamber 5b.

Referring to FIG. 2, the X marks indicate the drain ports.

In the hydraulic circuit having the configuration described above, the control valve of the invention comprises ratio control valve 92. As described later, the amount of pressurized oil sent to hydraulic actuator 33 and the amount of pressurized oil drained from hydraulic actuator 33 are controlled by the signal pressure (solenoid pressure) from the linear solenoid 93.

Figure 3:
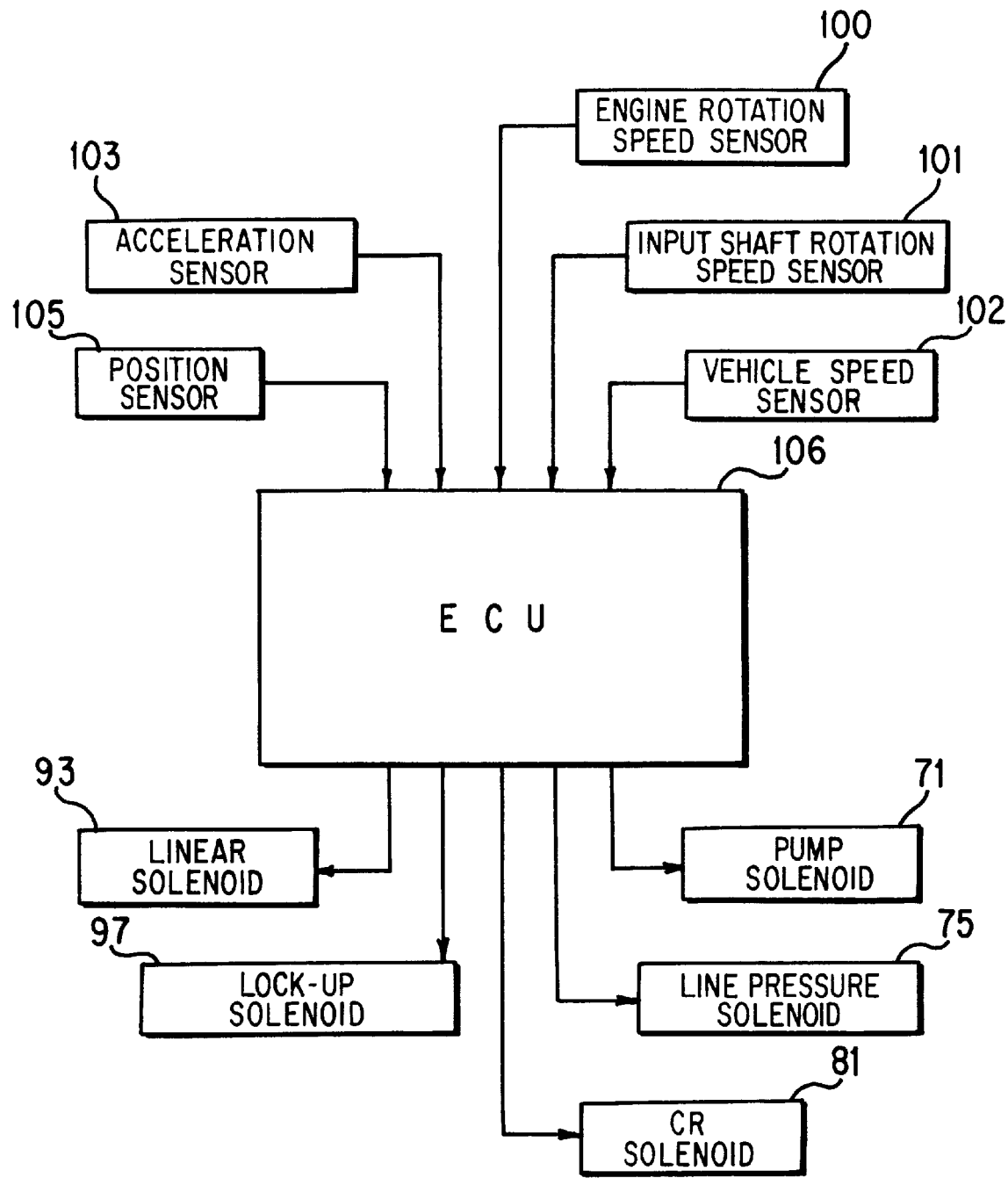
FIG. 3 is a drawing showing the electronic control portion.

FIG. 3 shows the electronic control section of continuous transmission 1. In this figure, as well as FIG. 1 and FIG. 2, an engine rotation speed sensor 100 detects the engine rotation speed, an input shaft rotation speed sensor 101 detects the rotation speed of input shaft 12, and a vehicle speed sensor 102 detects the speed of secondary pulley 29, i.e. the vehicle speed. An acceleration sensor 103 detects how far the accelerator pedal is pushed down, i.e. the throttle setting. A position sensor 105 detects the position of manual valve 77. The signals from these sensors are sent to a control section (ECU) 106 comprising a computer mounted in the vehicle. Various operations are performed by ECU 106, and prescribed signals are sent to solenoid valve 71 for the oil pump, line pressure solenoid valve 75 for controlling the line pressure, C2 solenoid 81 as a duty solenoid valve for controlling second clutch C2, solenoid 93 for ratio control (changing speed), and linear lock-up solenoid valve 97 for controlling lock-up.

Referring to FIG. 1 through FIG. 3, the following is a description of the operations performed by continuous transmission 1 as a whole. The rotation of oil pump 21, which is based on the engine rotation, generates a predetermined oil pressure. Control section (ECU) 106 performs operations based on the load torque and other inputs and sends a control signal to line pressure solenoid valve 75. Primary regulator valve 72 is controlled by line pressure solenoid valve 75 so that the oil pressure is adjusted to the line pressure. The oil pressure from oil pump 21 is distributed to port 21a, 21b at roughly equal flow rates. Solenoid valve 71 is controlled by a signal from control section (ECU) 106 based on the amount of oil needed for the various sections. When a relatively high rate of flow is required, oil control valve 70 is moved to a leftward position, and the oil pressures from ports 21a, 21b are merged via valve 70. The oil pressure merged from the port 21a and the port 21b is used as the line pressure. When a relatively low rate of flow is sufficient, oil pump control valve 70 is moved to a rightward position so that the oil pressure from pump 21 that goes through port 21b is recirculated to oil pump 21 while the oil pressure from port 21a is used as the line pressure, thus decreasing the drive torque from pump 21.

When manual valve 77 is in the D range or the L range, the oil pressure from port 1 is sent via port 2 to first clutch hydraulic servo C1, engaging first clutch $C_1$. In this state, the rotation from engine output shaft 10 is transferred to primary pulley 26 via torque converter 6, input shaft 12, one-way clutch F, and first clutch $C_1$. Then, the rotation is modified via CVT 2 and is transferred to secondary shaft 27, and is then sent to left and right axles 60, 61 via counter shaft 7 and differential device 9.

When manual valve 77 is in the D range and the vehicle speed is relative low (e.g., 40 km/h or less), only first clutch $C_1$ is engaged, via one-way clutch F. Thus, the engine brake does not operate during coasting. When manual valve 77 is shifted to the L range, or when manual valve 77 is in the D range and the vehicle speed is relatively high, control section (ECU) 106 sends a duty signal to solenoid valve 81 based on the detected vehicle speed and the shift position. Solenoid valve 81 controls C2 control valve 80, and a predetermined pressure is applied to hydraulic servo C2, thus engaging second clutch $C_2$ as well. This allows the engine brake to operate during coasting. It would be desirable for the D range and the L range to have different speed-change ratios for CVT 2 corresponding to the state of the vehicle (e.g., throttle setting, speed).

When manual valve 77 is moved to the reverse range, the oil pressure from port 1 is sent to brake hydraulic servo B1 via port 3. In this state, a ring gear R of planetary gear 50 is engaged, while the rotation of a sun gear S from input shaft 12 is converted to a reverse rotation by carrier CR, and this reverse rotation is transferred to primary pulley 26.

As described above, in continuously variable transmission 1, the torque from engine output shaft 10 is transferred to input shaft 12 via torque converter 6. Torque converter 6 performs the conversion so that the torque ratio is especially high when the vehicle is starting to move. Thus, the converted rotation is transferred to input shaft 12 and the vehicle is able to start smoothly. Also, torque converter 6 comprises a lock-up clutch 5. During stable motion at high-speeds, lock-up clutch 5 is connected so that engine output shaft 10 and input shaft 12 are directly connected, thus limiting the loss due to the oil flow in torque converter 6. In the low and medium speed ranges before clutch 5 is completely engaged, slip control is performed so that the rotation difference between the input side and the output side of lock-up clutch 5 is at a predetermined value.

In CVT 2 of continuously variable transmission 1, the line pressure from primary regulator valve 72 is sent to hydraulic actuator 35 of secondary pulley 31 so that a belt grasping force corresponding to the load torque is applied. Linear solenoid valve 93 is controlled based on the speed-change signal from control section (ECU) 106, and the ratio control valve 92 is controlled based on the signal pressure from linear solenoid valve 93. The adjusted pressure from the output port of control valve 92 is sent to hydraulic actuator 33, which comprises a double piston, for primary pulley 26. This allows the transmission ratio of CVT 2 to be controlled to appropriate settings.

This transmission ratio of CVT 2 is controlled by the control valve (transmission control valve) of the invention. In the oil-pressure circuit shown in FIG. 2, the control valve of the invention is implemented in ratio control valve 92 (hereinafter referred to as "control valve" 92).

Figure 4A:
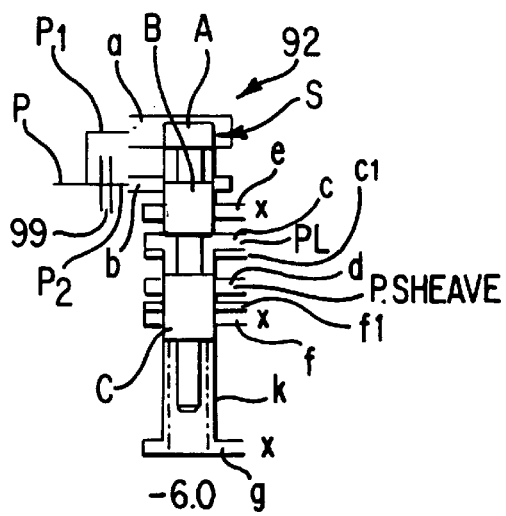
FIGS. 4(a)–(i) show the valve stroke positions and the opening and closing of the ports for the control valve.
Figure 4B:
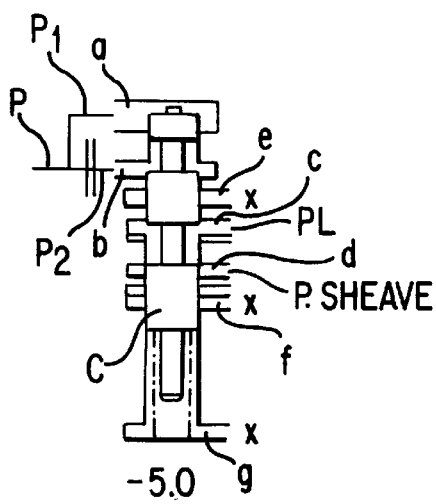
Figure 4C:
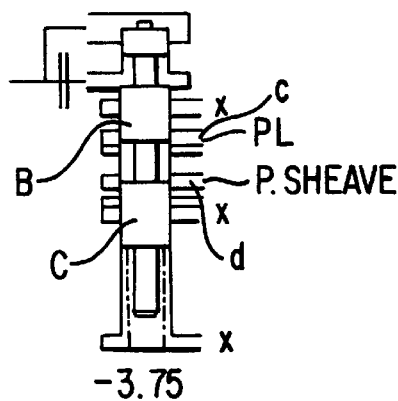
Figure 4D:
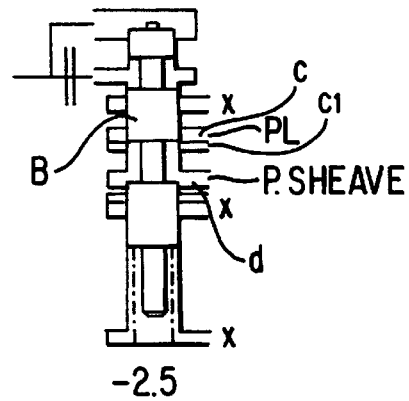
Figure 4E:
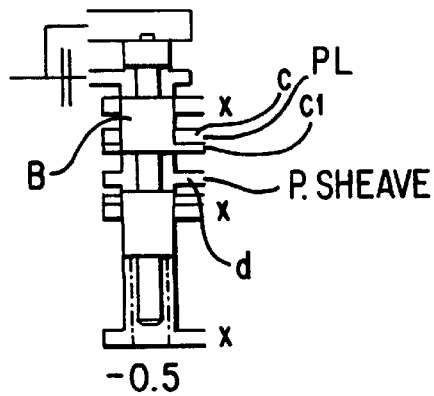
Figure 4F:
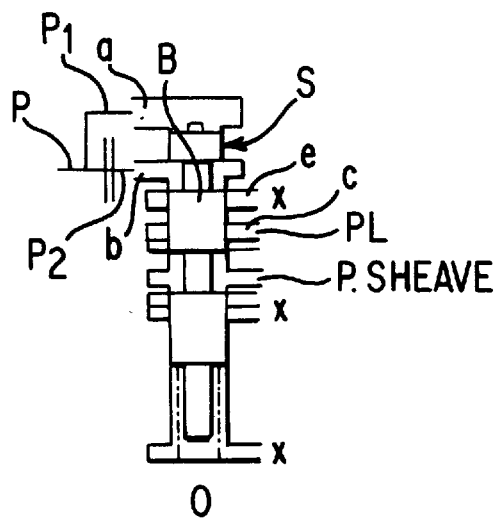
Figure 4G:
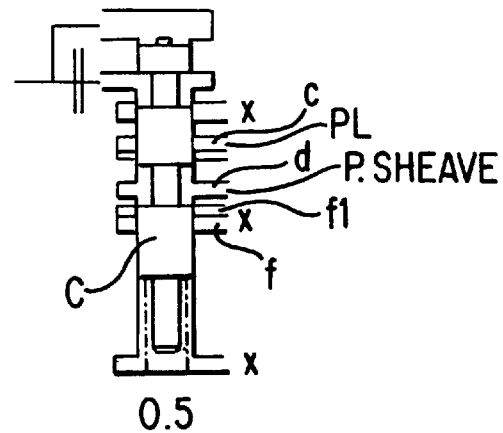
Figure 4H:
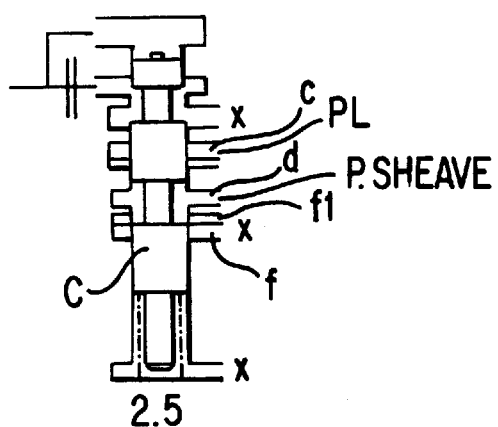
Figure 4I:
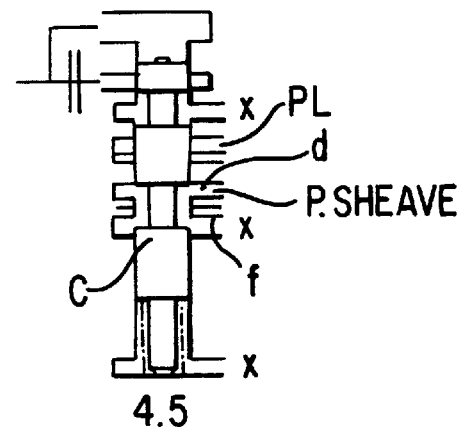

As shown in FIG. 4(a), control valve 92 comprises a spool S and a spring (biasing member) K, which biases spool S upward. Starting from the top, a land A, a land B, and a land C are formed on spool S. Land B is formed so that it has a slightly larger pressure-receiving area on its upper surface compared to the lower surface of land A. Because of this difference in pressure-receiving areas, a downward force is applied to spool S in response to a signal pressure received from the first passage ($P_1$) or the second input passage ($P_2$). The spring constant of spring K is set so that strokes of spool S range between the upper end (FIG. 4(a)) and the lower end (FIG. 4(i)) of the range defined by the minimum and maximum values of signal pressure (solenoid pressure) P. FIGS. 4(a)–(i) show the positions of spool S (hereinafter referred to as the "valve stroke position") spanning a complete stroke. The position shown in (f) is used as the reference, and positions above that are referred to as negative (−) and the positions below that are positive (+). Based on this, the valve stroke position is −6 when spool S is at the uppermost position shown in (a) and is +4.5 when spool S is at the lowermost position shown in (i) (the "+" signs will be omitted). As described later, the valve stroke position will change to the values shown in (a) through (i) as the signal pressure varies.

Control valve 92 comprises a first input port a and a second input port b. First input port a receives a first signal pressure $P_1$ resulting from the splitting of signal pressure P from linear solenoid valve 93. Second input port b receives a second (other) signal pressure $P_2$ resulting from the splitting of signal pressure P and passing through an orifice 99. An input port c is disposed below second input port b. Input port c receives a line pressure PL, adjusted by primary regulator valve 72 described above. Below input port c is disposed a port d, which is continuous with hydraulic actuator 33 for primary pulley 26. A drain port e is disposed between second input port b and input port c and can be made continuous with second input port b based on the positioning of land B. A drain port f is disposed below port d and can be made continuous with port d based on the position of land C. Below that, there is disposed a drain port g that is continuous with the portion below land C.

Input port c and drain port f are formed with a notch $c_1$ and a notch $f_1$ respectively. When spool S moves, there is a gradual change in area for input port c and drain port f as a result of the amounts of notches $c_1$ and $f_1$ exposed by the movement of lands B and C.

The following is a description of the operations of control valve 92.

Figure 5:
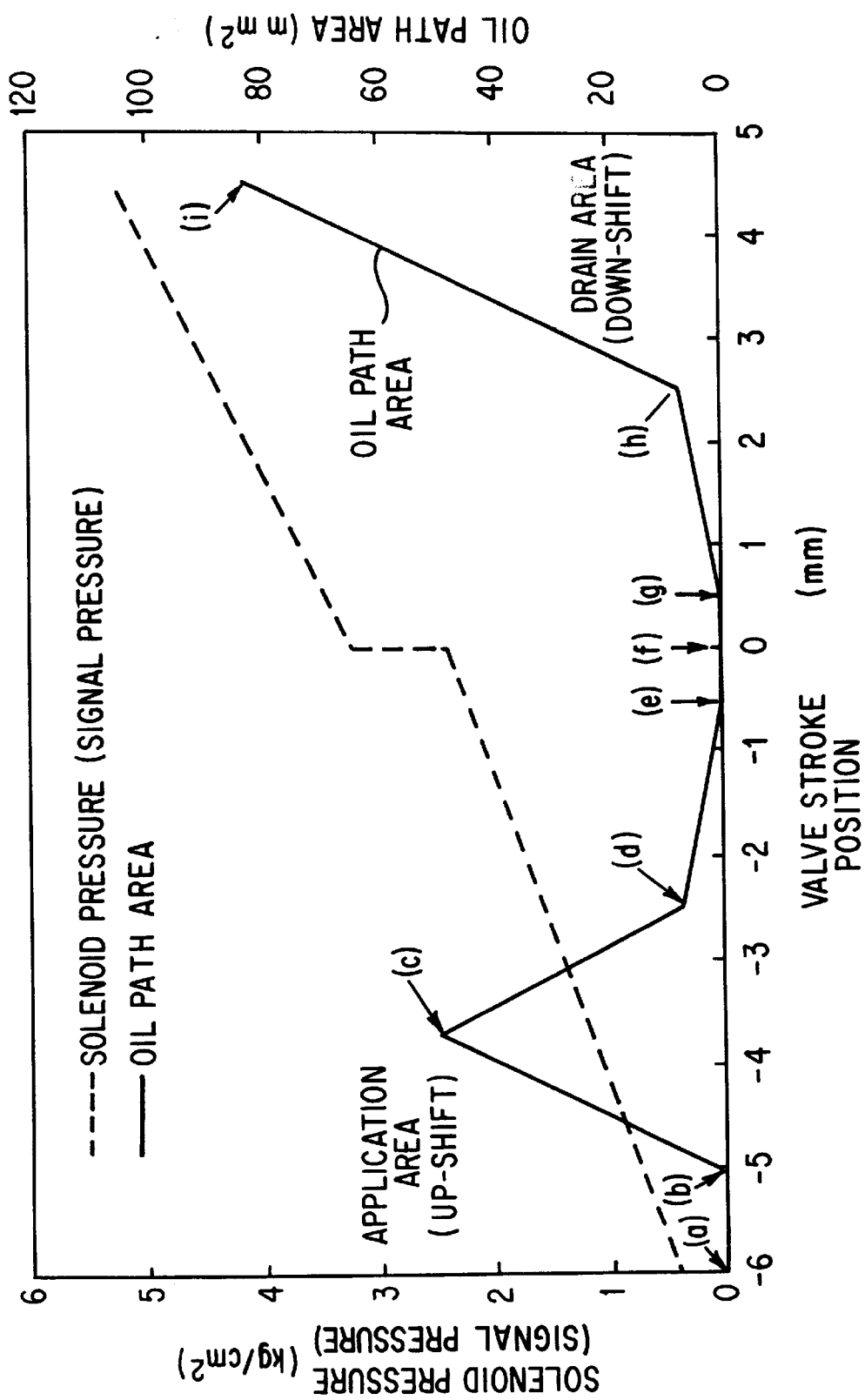
FIG. 5 is a graph showing the relationship of the signal pressure and the oil-path area to the valve stroke position.
Figure 6:
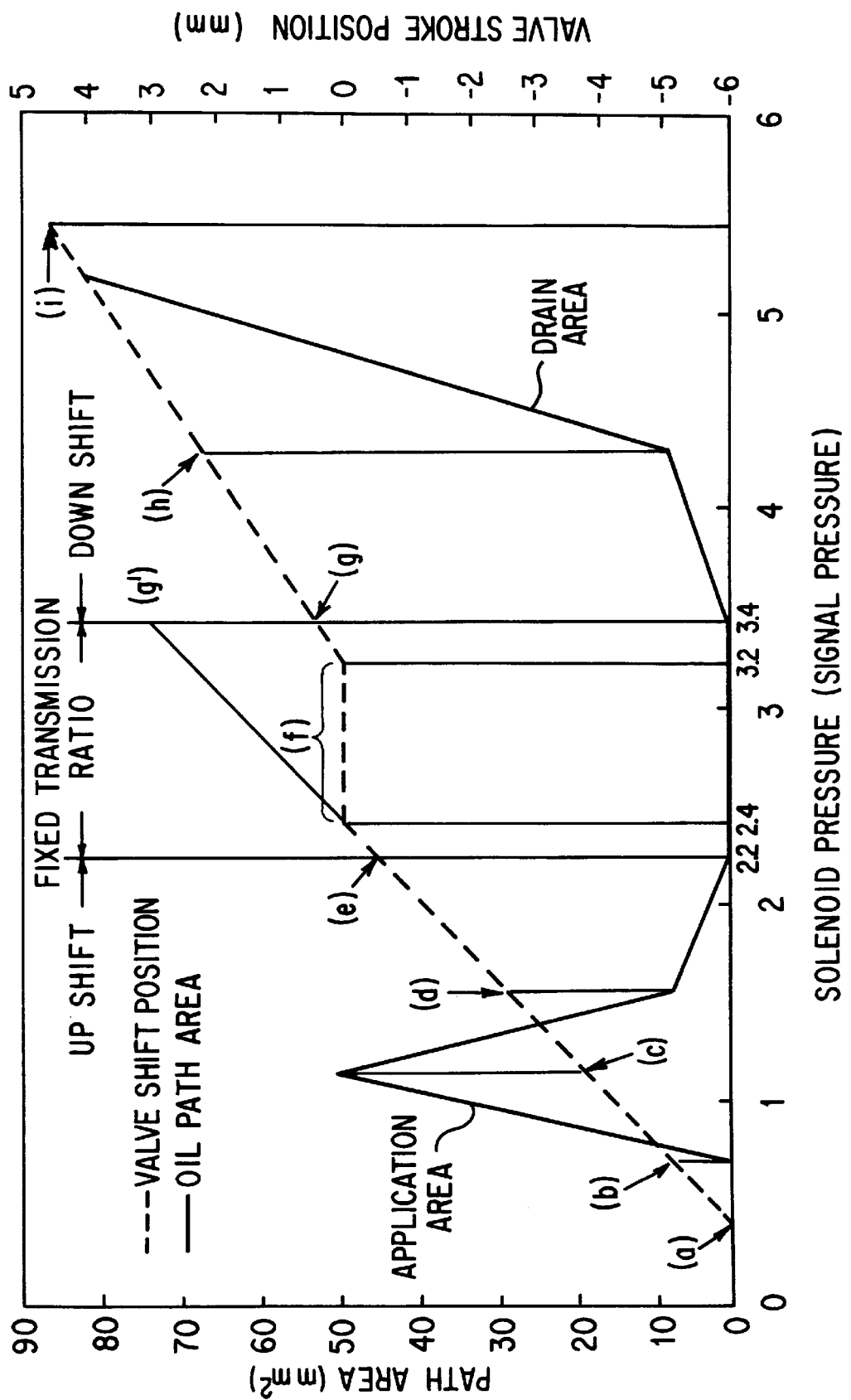
FIG. 6 is a graph showing the relationship of the oil-path area and the valve stroke position to the signal pressure.

Referring to FIGS. 4(a)–4(i) and FIG. 5, the relationship between the valve stroke position and the signal pressure and the oil path area, using the valve stroke position as the reference, will be described. Then, referring to FIG. 6, the relationship between the signal pressure and the oil path area and the valve stroke position, using the signal pressure as the reference, will be described. With FIG. 5 and FIG. 6, the same information is illustrated with the vertical and horizontal axes reversed. In other words, the horizontal axis represents the valve stroke position in FIG. 5 and the signal pressure in FIG. 6. In FIG. 6, the valve stroke position is plotted over a linear change in the signal pressure, thus providing a good illustration of the characteristics of the present invention. In FIG. 5, the relationship between the valve stroke position and the oil path area are directly illustrated, thus providing a clear correspondence with FIG. 4.

Referring to FIG. 4 and FIG. 5, the following is a description of the relationship between the valve stroke position and the oil path area.

The solenoid pressure is varied linearly by ratio-control linear solenoid valve 93 for ratio control and is applied to control valve 92 as signal pressure P. Signal pressure P is split into two signal pressures. First signal pressure $P_1$ is sent directly to first input port a. Second signal pressure $P_2$, which undergoes a pressure drop at orifice 99, is sent to second input port b.

When signal pressure P is 0 (i.e., when first signal pressure $P_1$ and second signal pressure $P_2$ are 0 and the valve stroke value is −6.0 as shown in FIG. 4 (a)), spool S is pressed upward by spring K to the uppermost position. In this state, first input port a and second input port b on the left side of the figure are open. With the ports on the right of the figure, drain port e is closed, input port c is open, port d is closed, drain port f is closed, and drain port g is open. First input port a and drain port g are always open so the descriptions of whether these ports are opened or closed will be omitted below. In this state, line pressure PL is applied to input port c, but port d is closed and the application area is 0, so line pressure PL is not applied to hydraulic actuator 33. "Application area" refers to the smaller of the open areas for input port c and port d, i.e. the area through which the pressurized oil can flow.

When signal pressure P is increased linearly and is at or above a predetermined pressure, signal pressures $P_1$, $P_2$ applied to first port a and second port b push spool S down in opposition to spring K.

When signal pressure P is increased further so that the valve stroke amount is −5.0 as shown in FIG. 4 (b), port d, which had been blocked by land C, is opened, and the application area begins to increase. When this state continues and the valve stroke position reaches −3.75, as shown in FIG. 4 (c), the area of input port c that is opened up by land B becomes equal to the area of input port d that is opened up by land C. The application area is the greatest at this point.

When signal pressure P is increased further, the application area decreases, and the valve stroke position becomes −2.5, as shown in FIG. 4 (d). Land B reaches notch $c_1$ of input port c, and from that point to when the valve stroke position reaches −0.5 as shown in FIG. 4 (e), the application area decreases gradually due to the decrease in the open area at notch $c_1$.

When the valve stroke position is −0.5 as shown in FIG. 4 (e), input port c, including notch $c_1$, is completely sealed, and the application area becomes 0.

When signal pressure P is further increased and the valve stroke position reaches 0, drain port e, which had been closed by land B until then, begins to open. Then, signal pressure $P_2$ for second input port b drops, causing spool S to be raised slightly upward by spring K. Drain port e is blocked by land B again, and signal pressure $P_2$ begins to increase. Drain port e is opened and closed repeatedly in this manner. Thus, spool S is kept at a position where the valve stroke position is 0 even if signal pressure P varies within a predetermined range.

When signal pressure P exceeds the predetermined range, the descent of spool S begins again. When the valve stroke position reaches 0.5, notch $f_1$ of drain port f, which had been blocked by land C, is opened and made continuous with port d. This causes the pressurized oil from hydraulic actuator 33 to begin to drain. Thereafter, up to valve stroke position 2.5 as shown in FIG. 4 (h), the opening of notch $f_1$ causes the drain area to increase gradually. After the valve stroke position of 2.5 as shown in FIG. 4 (h), the drain area is increased by the increase in the open area of drain port f. This continues until the valve stroke position is 4.5 as shown in FIG. 4 (i).

Signal pressure P is shown as a dotted line in FIG. 5. Signal pressure P is vertical at a valve stroke position of 0. This is because the valve stroke position is kept at the 0 position even though signal pressure P is changing within a predetermined range.

Referring to FIG. 6, the following is a discussion regarding this point.

In FIG. 6, the information shown in FIG. 5 is presented with the horizontal axis representing signal pressure P. In the present invention, signal pressure P on the horizontal axis changes in the positive direction. Corresponding to this increase in signal pressure P, the valve stroke position increases linearly from −6.0 (a) to −5.0 (b), −3.75 (c), −2.5 (d), −0.5 (e), and up to the left end of (f). The valve stroke position stays at 0 (f) within a prescribed range for signal pressure P (2.4–3.2 kg/cm², for example). Then, the valve stroke position increases linearly again from the right end of 0 (f) through 0.5 (g), 2.5 (h), and 4.5 (i).

In FIG. 6, when the valve stroke position is between −0.5 (e) and 0.5 (g), the oil path area is 0 (i.e., both the application area and the drain area are 0). During this interval, the pressurized oil in hydraulic actuator 33 is maintained with no oil being received or drained. Thus, CVT 2 is kept at a fixed transmission ratio. The corresponding signal pressure P for this case would be 2.2–3.4 kg/cm². Thus, when signal pressure P is within the range 2.2–3.4 kg/cm², the oil path area is 0 and the transmission ratio is fixed. The difference between valve stroke positions over this interval is 0.5−(−0.5)=1.0 mm. In other words, a slight 1 mm change in the valve stroke position can correspond to a fixed transmission range for signal pressure P of 2.2–3.4 kg/cm². This is possible because, between (e) and (g), (f) has a range of 2.2–3.4 kg/cm² where the valve stroke position is 0.

With the conventional technology, providing a long valve stroke position and a large fixed transmission ratio range is more difficult. If, for example, a fixed transmission ratio is to be achieved for a signal pressure P range of 2.2–3.4 kg/cm², the difference of valve strokes between (e) and (g'), as shown in FIG. 6, would need to be 3.0−(−0.5)=3.5 mm. With the present invention, the same difference is 1 mm, as described above.

Furthermore, in the present invention, the valve stroke position is maintained at 0 within the signal pressure P range of 2.4–3.2 kg/cm². Thus, the valve stroke position remains at 0 even when signal pressure P varies within this range so that compared to the conventional technology, the present invention provides more reliability when there is vibration due to noise and other disturbances.

In the description of the embodiment above, signal pressure P varies linearly from the lowermost point to the uppermost point. When signal pressure P varies linearly from the uppermost point to the lowermost point, operations would take place in the reverse order as when signal pressure P increases. Thus, the operations would follow a sequence going from FIG. 4 (i) to (a). In FIG. 5, the valve stroke position would vary from 5 to −6. In FIG. 6, signal pressure P would go from 6 to 0.

In the description above, signal pressure P is described as varying linearly. However, the present invention is not limited to this. For example, the present invention can involve a configuration as described above wherein signal pressure P increases monotonically (or decreases monotonically).

What is claimed is:

1. An oil-pressure control device for a continuously variable transmission device, said oil pressure control device comprising:
   a control valve for shifting said continuously variable transmission device between an upshift position, a fixed transmission ratio position and a downshift position by control of oil flow to said continuously variable transmission device, said control valve including,
   a spool slidably supported within said control valve;
   spool biasing means for biasing said spool in a first direction within said control valve;
   a first input port for receiving a first portion of a signal pressure through a first passage connected to a signal pressure generating mechanism;
   a second input port for receiving a second portion of said signal pressure through a second passage branched off of said first passage, said second passage including an orifice; and
   said second input port being continuous with a first drain port during a predetermined range of said signal pressure input through said first input port and said second input port as said signal pressure is varied to move said spool in a second direction opposite said first direction against the bias of said spool biasing means to shift said continuously variable transmission device between said upshift position, fixed transmission ratio position and downshift position, said continuously variable transmission device being in said fixed transmission ratio position during said predetermined range of said signal pressure.

2. The oil-pressure control device according to claim 1, wherein said control valve further includes:
   a third input port for receiving a line pressure from a line pressure generating means; and
   an output port for supplying at least a portion of said line pressure received through said third input port through a third passage to said continuously variable transmission device.

3. The oil-pressure control device according to claim 2 wherein said control valve further includes:
   a second drain port for draining at least a portion of said line pressure from said output port.

4. The oil-pressure control device according to claim 2, wherein said spool includes a plurality of lands spaced along said spool such that a first land is positioned over a portion of said third input port when a second land is positioned over a portion of said output port.

5. A control valve for receiving a signal pressure from a signal pressure generating mechanism, said control valve comprising:
   a spool slidably supported within said control valve;
   spool biasing means for biasing said spool in a first direction within said control valve;
   a first input port receiving a first portion of said signal pressure through a first passage;
   a second input port receiving a second portion of said signal pressure through a second passage, said second passage branching from said first passage;
   an orifice in said second passage; and
   a drain port, wherein said second input port becomes continuous with said drain port when the signal pressure input through said first input port and said second input port falls within a predetermined range to move said spool in a second direction opposite to said first direction against the bias of said spool biasing means.

6. The control valve according to claim 5, further including:
   a third input port for receiving a line pressure from a line pressure generating means; and
   an output port for supplying at least a portion of said line pressure received through said third input port through a third passage.

7. The control valve according to claim 6, wherein said spool includes a plurality of lands spaced along said spool such that a first land is positioned over a portion of said third input port when a second land is positioned over a portion of said output port.

* * * * *